US008450868B2

(12) United States Patent
Tsutsumi et al.

(10) Patent No.: US 8,450,868 B2
(45) Date of Patent: *May 28, 2013

(54) WIND TURBINE GENERATOR AND TIDAL CURRENT GENERATOR AND OPERATION METHOD THEREOF

(75) Inventors: Kazuhisa Tsutsumi, Tokyo (JP); Masayuki Shimizu, Tokyo (JP); Niall Caldwell, Lothian (GB); Daniil Dumnov, Lothian (GB); Stephen Laird, Lothian (GB); Venkata Pappala, London (GB)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/999,123

(22) PCT Filed: Nov. 30, 2010

(86) PCT No.: PCT/JP2010/006982
§ 371 (c)(1),
(2), (4) Date: Dec. 9, 2011

(87) PCT Pub. No.: WO2012/073281
PCT Pub. Date: Jun. 7, 2012

(65) Prior Publication Data
US 2012/0104752 A1 May 3, 2012

(51) Int. Cl.
*F03D 9/00* (2006.01)
(52) U.S. Cl.
USPC ............................................. 290/44; 290/55
(58) Field of Classification Search
USPC .......................................... 290/44, 55, 43, 54
See application file for complete search history.

(56) References Cited

U.S. PATENT DOCUMENTS 4,503,673 A    3/1985   Schachle et al.
(Continued)

FOREIGN PATENT DOCUMENTS

| EP | 0020207 A1 | 12/1980 |
| EP | 2151574 A2 | 2/2010 |
| WO | 2009058022 A1 | 5/2009 |

OTHER PUBLICATIONS

International Search Report and Written Opinion for PCT/JP2010/006982, dated Apr. 19, 2012.
Rampen et al., Progress on the Development of the Wedding-Cake Digital Hydraulic Pump/Motor, pp. 289-296, 1995.

(Continued)

*Primary Examiner* — Tho D Ta
(74) *Attorney, Agent, or Firm* — Lowe Hauptman Ham & Berner, LLP

(57) ABSTRACT

An object of the invention is to provide a wind turbine generator or a tidal current generator which is equipped with a hydraulic transmission and achieves a superior power generation efficiency, and a operation method thereof. The wind turbine generator 1 comprises a hydraulic pump 12 of a variable displacement type which is rotated by the main shaft 8, a hydraulic motor 14 of a variable displacement type which is connected to the generator 20, and a high pressure oil line 16 and a low pressure oil line 18 which are arranged between the hydraulic pump 12 and the hydraulic motor 14. The pump controller 32 obtains a target torque of the hydraulic pump 12 at which a power coefficient becomes maximum, and then sets a displacement $D_p$ of the hydraulic pump 12 based on the target torque and the pressure in the high pressure oil line 16. The motor controller 34 sets a displacement $D_m$ of the hydraulic pump 14 based on a discharge amount $Q_p$ of the hydraulic pump obtained from the displacement $D_p$ of the hydraulic pump 12 so that the rotation seed of the generator 20 becomes constant.

19 Claims, 11 Drawing Sheets

U.S. PATENT DOCUMENTS

| | | |
|---|---|---|
| 7,436,086 B2 | 10/2008 | McClintic |
| 7,586,206 B2 * | 9/2009 | Barton et al. ............... 290/44 |
| 8,030,791 B2 * | 10/2011 | Lang et al. ............... 290/44 |
| 2007/0024058 A1 | 2/2007 | McClintic |
| 2009/0273186 A1 | 11/2009 | Plant, Jr. |
| 2010/0032959 A1 | 2/2010 | Nies |
| 2010/0040470 A1 | 2/2010 | Nies et al. |
| 2010/0207398 A1 | 8/2010 | Burt |
| 2010/0320770 A1 | 12/2010 | Dahlhaug |
| 2011/0142596 A1 * | 6/2011 | Nies ............... 415/13 |

OTHER PUBLICATIONS

Salter, S. H., Proposal for a Large, Vertical-Axis Tidal-Stream Generator with Ring-Cam Hydraulics, Third European Wave Energy Conference, Sep. 30-Oct. 2, 1998, Patras Greece.

Rampen et al., Gearless transmissions for large wind-turbines—The history and future of hydraulic drives, pp. 1-9, Dewek Bremen, Dec. 2006.

\* cited by examiner

WIND TURBINE GENERATOR AND TIDAL CURRENT GENERATOR AND OPERATION METHOD THEREOF

RELATED APPLICATIONS

The present application is national phase of, and claims priority from, International Application Number PCT/JP2010/006982, filed Nov. 30, 2010.

TECHNICAL FIELD

The present invention relates a wind turbine generator and a tidal current generator, which transmit a rotation of a rotor to a generator via a fluid transmission having a combination of a hydraulic pump and a hydraulic motor and an operation method of the wind turbine generator.

BACKGROUND ART

In recent years, from a perspective of preserving the environment, it is becoming popular to use a renewable energy type turbine generator such as a wind turbine generator utilizing wind power and a tidal current generator utilizing tidal current.

Among the turbine generators, the wind turbine generator converts motion energy of the wind to the rotation energy of the rotor and further converts the rotation energy of the rotor to electric power by the generator. In a common wind turbine generator, the rotation speed of the rotor is about a few rotations per minute to tens of rotations per minute. Meanwhile, a rated speed of the generator is normally 1500 rpm or 1800 rpm and thus a mechanical gearbox is provided between the rotor and the generator. Specifically, the rotation speed of the rotor is increased to the rated speed of the generator by the gearbox and then inputted to the generator.

In recent years, the gearbox tends to become heavier and more expensive as the wind turbine generators are getting larger to improve power generation efficiency. Thus, a wind turbine generator equipped with a hydraulic transmission adopting a combination of a hydraulic pump and a hydraulic motor of a variable capacity type is getting more attention.

For instance, Patent Literature 1 discloses a wind turbine generator using a hydraulic transmission including a hydraulic pump rotated by a rotor and a hydraulic motor connected to a generator. In the hydraulic transmission of this wind turbine generator, the hydraulic pump and the hydraulic motor are connected via a high pressure reservoir and a low pressure reservoir. By this, the rotation energy of the rotor is transmitted to the generator via the hydraulic transmission. The hydraulic pump is constituted of a plurality of sets of a piston and a cylinder, and a cam which periodically reciprocates the plurality of pistons in the cylinders.

Further, Patent Literature 2 describes a wind turbine generator adopting a hydraulic transmission constituted of a hydraulic pump rotated by a rotor, a hydraulic motor connected to a generator, and an operating oil path arranged between the hydraulic pump and the hydraulic motor. In the hydraulic transmission of this wind turbine generator, the hydraulic pump is constituted of a plurality of sets of pistons and cylinders, cams which periodically reciprocate the pistons in the cylinders, and high pressure valves and low pressure valves which open and close with the reciprocation of the pistons. By latching the piston near a top dead center, a working chamber surrounded by the cylinder and the piston is disabled, and then the displacement of the hydraulic pump is changed.

Although the hydraulic pump and the hydraulic motor are not variable displacement type, Patent Literature 3 discloses a wind turbine generator having a hydraulic pump and a hydraulic motor. The wind turbine generator of Patent Literature 3 maintains the rotation speed of the generator constant by adjusting the pressure of operating oil to be supplied from a hydraulic pump to a hydraulic motor. In this wind turbine generator, a discharge side of the hydraulic pump is connected to an intake side of the hydraulic motor via an inner space of the tower functioning as a high pressure tank, and an intake side of the hydraulic pump is connected to a discharge side of the hydraulic motor via a low pressure tank arranged below the tower.

CITATION LIST

Patent Literature

PTL 1: US 2010/0032959
PTL 2: US 2010/0040470
PTL 3: U.S. Pat. No. 7,436,086 B

SUMMARY OF INVENTION

Technical Problem

Herein, the wind turbine generator and the tidal current generator are referred to as a renewable energy type generator. Among the renewable energy generators, in a wind turbine generator, a rotation speed of a rotor at which the maximum output is generated is different depending on a wind speed or flow speed of tidal current. To achieve the maximum generation efficiency, it is necessary to change the rotation speed of the rotor depending on a wind speed. From this perspective, in a conventional wind turbine equipped with a gearbox of mechanical type (gear type), an inverter is arranged between a generator and a grid and the rotation speed of the rotor is changed by controlling the inverter. This variable speed operation method is commonly used.

Meanwhile, Patent Literatures 1 to 3 disclose the wind turbine equipped with the hydraulic transmission. However, none of Patent Literatures 1 to 3 proposes a specific control to improve the power generation efficiency. There is so far no operation method established to improve the power generation efficiency.

In view of the issues above, an object of the present invention is to provide a wind turbine generator and a tidal current generator, which are equipped with a hydraulic transmission and achieve a superior power generation efficiency, and a operation method thereof.

Solution to Problem

The present invention proposes a wind turbine generator or a tidal current generator comprising: a hub; a main shaft which is coupled to the hub; a generator which converts rotation energy transmitted from the main shaft to electric power; a hydraulic pump of variable displacement type which is driven by the main shaft; a hydraulic motor of variable displacement type which is connected to the generator; a high pressure oil line which is arranged between a discharge side of the hydraulic pump and an intake side of the hydraulic motor; a low pressure oil line which is arranged between an intake side of the hydraulic pump and a discharge side of the hydraulic motor; and a control unit in communication with a pump controller and a motor controller, the pump controller adjusting a displacement $D_p$ of the hydraulic pump, the motor controller adjusting a displacement $D_m$ of the hydraulic motor, wherein the pump controller sets a target torque of the hydraulic pump, and then sets the displacement $D_p$ of the hydraulic pump based on the target torque and a pressure of operating oil in the high pressure oil line, and wherein the motor controller sets the displacement $D_m$ of the hydraulic motor based on a discharge amount $Q_p$ of the hydraulic pump so that a rotation speed of the generator becomes constant, the discharge amount $Q_p$ of the hydraulic pump being obtained from the displacement $D_p$.

In this wind turbine generator or the tidal current generator, the pump controller sets the target torque of the hydraulic pump at which a power coefficient becomes maximum, and then sets the displacement $D_p$ of the hydraulic pump based on the target torque and the pressure of operating oil in the high pressure oil line so as to control the hydraulic pump. As a result, the power generation efficiency is improved.

Further, the motor controller sets the displacement $D_m$ of the hydraulic motor based on the discharge amount $Q_p$ of the hydraulic pump so that the rotation speed of the generator becomes constant, and the discharge amount $Q_p$ of the hydraulic pump is obtained from the displacement $D_p$. Therefore, even when the target torque of the hydraulic pump is changed, the rotation speed of the generator can be kept constant. As a result, the generator can generate electric power having a constant frequency.

Furthermore, "a pressure of operating oil in the high pressure oil line" which is used by the pump controller to set the displacement $D_p$ of the hydraulic pump may be an actual measurement value of the pressure of the operation oil or may be a set value (target pressure).

The above wind turbine generator or the tidal current generator may further comprise a rotation speed meter which measures a rotation speed of the main shaft, wherein the pump controller sets the target torque at which a power coefficient becomes maximum in accordance with the rotation speed of the main shaft measured by the rotation speed meter.

The target torque at which the power coefficient becomes maximum is set in accordance with the rotation speed of the main shaft measured by the rotation speed meter, and the hydraulic transmission is controlled with use of the target torque. As a result, the power generation efficiency of the wind turbine generator or the tidal current generator is improved. Further the rotation speed of the main shaft can be measured with high precision and thus, based on the measured rotation speed of the main shaft, the hydraulic pump can be controlled adequately.

Alternatively, the wind turbine generator or the tidal current generator may further comprise an anemometer or an speed meter which measures a wind speed and the pump controller may obtain from the measured wind speed or the speed of the tidal current the target torque at which a power coefficient becomes maximum.

In this manner, it is possible to obtain from the measured wind speed measured by the anemometer or the speed of the tidal current measured by the speed meter the target torque at which a power coefficient becomes maximum. The obtained target torque is used to control the hydraulic transmission so as to improve the power generation of the wind turbine generator or the tidal current generator.

In the wind turbine generator or the tidal current generator, it is also preferable that each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which opens and closes a communication path between each of the oil chambers and the high pressure oil line, and low pressure valves each of which opens and closes a communication path between each of the oil chambers and the low pressure oil line, and that the pump controller controls a ratio of disabled oil chambers to all of the oil chambers of the hydraulic pump so as to adjust the displacement $D_p$ of the hydraulic pump, the disabled oil chambers being kept such that during a cycle of the piston of the hydraulic pump starting from a bottom dead center, reaching a top dead center and returning to the bottom dead center, the high pressure valve of the hydraulic pump is closed and the low pressure valve of the hydraulic pump remains open, and that the motor controller controls a ratio of disabled oil chambers to all of the oil chambers of the hydraulic motor so as to adjust the displacement $D_m$ of the hydraulic motor, the disabled oil chambers being kept such that during a cycle of the piston of the hydraulic motor starting from a bottom dead center, reaching a top dead center and returning to the bottom dead center, the high pressure valve of the hydraulic motor is closed and the low pressure valve of the hydraulic motor remains open.

The state of each oil chamber (working chamber or disabled chamber) can be switched every cycle in which the piston completes one set of upward and downward motions. Therefore, the displacements of the hydraulic pump and the hydraulic motor can be promptly changed by changing the ratio of disabled chambers to all of the oil chambers. It is also possible to use partially-disabled chambers, in which the high pressure valve is open for a portion (but not all) of an upward or downward motion, with the low pressure valve being open for most of the rest of the upward or downward motion.

The wind turbine generator or the tidal current generator may preferably be constructed such that the cam of the hydraulic pump is a ring cam which is disposed annularly on an outer circumference of the main shaft and has a cam profile defining a plurality of waves with a plurality of concave portions and convex portions that are alternately disposed around the main shaft, and that the cam of the hydraulic motor is an eccentric cam that is disposed eccentrically with respect to a shaft center of an output shaft of the hydraulic motor being coupled to the generator.

In a typical wind turbine generator, the rotation speed of the rotor is about a few rotations per minute to tens of rotations per minute while the rated speed of the generator is normally 1500 rpm or 1800 rpm. Thus, in the hydraulic transmission having the hydraulic pump and the hydraulic motor, it is necessary to increase the rotation of the rotor approximately 100 times to be transmitted to the generator. Herein, the speed increasing ratio of the hydraulic transmission is determined by the ratio of the displacement $D_p$ of the hydraulic pump to the displacement $D_m$ of the hydraulic motor. That is, the displacement $D_p$ of the hydraulic pump must be set approximately 100 time greater than the displacement $D_m$ of the hydraulic motor. The displacement of the hydraulic pump can be increased by making the capacity of each cylinder bigger or providing more cylinders. However, this invites the size of the hydraulic pump to be approximately 100 times larger.

In view of this, the ring cam having the cam profile defining a plurality of waves with a plurality of concave portions and convex portions that are alternately disposed, is selected as the cam of the hydraulic pump. By this, while the main shaft completes one rotation, each of the pistons of the hydraulic pump completes many sets of upward and downward motions. As a result, the hydraulic transmission with the high speed increasing ratio can be obtained.

In the above wind turbine generator or the tidal current generator, it is preferable that the high pressure valves of the hydraulic pump are check valves that allow only fluid flow from the oil chambers to the high pressure oil line, and the low pressure valves of the hydraulic pump are normally open solenoid-operated face-sealing-valves, and that, for the oil chambers of the hydraulic pump other than the disabled oil chambers, the pump controller closes the low pressure valves when or after the pistons of the hydraulic pump reach the bottom dead center and keeps the low pressure valves shut by a pressure difference between the oil chambers and the low pressure oil line so as to reduce the electric power required to hold closed the low pressure valves immediately after their closure by the pump controller.

As described above, the high pressure valves of the hydraulic pump is the check valve and thus, the operating oil in the oil chamber is compressed during the cycle of the piston of the hydraulic pump 1 starting from the bottom dead center and reaching the top dead center. As a result, the pressure in the oil chamber becomes higher than the pressure in the high pressure oil line, thereby causing the high pressure valve to open automatically. Thus, there is no need to control the high pressure valve positively. Further, the high pressure valve of the hydraulic pump is the check valve with the structure that is simpler than that of the solenoid valve, and thus the size of the hydraulic pump can be made smaller.

Furthermore, while controlling the opening and closing of the high pressure valve and the low pressure valve in the oil chambers except for the disabled oil chambers of the hydraulic pump, past the point immediately after the piston reaches the bottom dead center, the low pressure valve is closed by the pressure difference between the oil chamber and the low pressure oil line. As a result, it is possible to save the electric power for holding closed the low pressure valve.

In the wind turbine generator or the tidal current generator, it is preferable that the high pressure valves of the hydraulic motor are face-sealing solenoid valves and the low pressure valves of the hydraulic motor are face-sealing solenoid valves, and that, for the oil chambers of the hydraulic motor other than the disabled oil chambers, the motor controller closes the low pressure valves immediately before the pistons of the hydraulic motor reach top dead center and then opens the high pressure valves in this order and then maintains the low pressure valves shut until immediately before the pistons of the hydraulic motor reach bottom dead center, and that the motor controller latches the high pressure valves in an open state until immediately before the re-opening of the low pressure valves.

As described above, after the piston of the hydraulic motor reaches the top dead center, the high pressure valve is latched in an open state until immediately before the piston reaches the bottom dead center. By this, it is possible to latch the high pressure valve in the open state while saving the electric power used to energize the high pressure valve.

The wind turbine generator or the tidal current generator may further comprise a pitch driving mechanism which adjusts a pitch angle of blades mounted on the hub, and the control unit may control the pitch driving mechanism so that the output of the wind turbine generator or the tidal current generator does not exceed the rated output.

By this, the generator 20 can generate a certain amount of output (rated output) of electric power in a rated operation wherein the power generation is carried out at a wind speed which is equal to or higher than the rated wind speed and lower than the cut-out wind speed.

The rated wind speed is a wind speed required to obtain the rated output by the generator and the cut-out wind speed is a wind speed required to stop the generator to secure the security of the wind turbine generator. For example, the rated speed may be set as approximately 10 m/s while the cut-out wind speed is set as approximately 25 m/s.

The wind turbine generator or the tidal current generator may further comprise an exciter which adjusts power factor of power generated in a stator of the generator by changing a field current in a rotator of the generator, the generator being an electromagnetic synchronous generator.

As described above, the generator is an electromagnetic synchronous generator and an exciter is also provided to adjust power factor of power field current by changing the field current. As a result, it is possible to supply to the grid the electric power of good quality which is adjusted to the desired power factor.

The wind turbine generator or the tidal current generator may also further comprise: a bypass oil line which is arranged between the high pressure oil line and the low pressure oil line to bypass the hydraulic motor; and a relief valve which is arranged in the bypass oil line to maintain hydraulic pressure of the high pressure oil line not more than a set pressure, wherein the pump controller eliminates the disabled oil chambers to maximize the displacement $D_p$ of the hydraulic pump so as to raise the pressure in the high pressure oil line to a set pressure of the relief valve and reduce a rotation speed of the main shaft.

As described above, the displacements of the hydraulic pump are adjusted to increase the displacement $D_p$ of the hydraulic pump and also to increase the pressure of the operating oil in the high pressure oil line. As a result, the torque required for rotating the hydraulic pump (=the displacement $D_p$ of the hydraulic pump X the pressure of the operating oil in the high pressure oil line) can be improved. By this, the rotation speed of the main shaft can be promptly reduced.

In the above wind turbine generator or tidal current generator, it is also preferable that each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which opens and closes a communication path between each of the oil chambers and the high pressure oil line, and low pressure valves each of which opens and closes a communication path between each of the oil chambers and the low pressure oil line, that the pump controller adjusts the displacement $D_p$ of the hydraulic pump by controlling a time period during which the low pressure valve of the hydraulic pump is kept closed while the piston of the hydraulic pump moves from a bottom dead center to a top dead center, and that the motor controller adjusts the displacement $D_m$ of the hydraulic motor by controlling a time period during which the high pressure valve of the hydraulic motor is kept open while the piston of the hydraulic motor moves from a top dead center to a bottom dead center.

By this, unlike the case of changing the number of disabled oil chambers to all of the oil chambers, the displacements of the hydraulic pump and the hydraulic motor can be changed continuously (not discretely) within the variable range.

Furthermore, during the operation of the hydraulic pump and the hydraulic motor, the displacements of the hydraulic pump and the hydraulic motor can be changed immediately no matter where the piston is positioned within each of the oil chambers when the signal for changing the displacements is transmitted by the pump controller or the motor controller.

In such a case, the wind turbine generator or the tidal current generator may preferably comprise a grid state determination unit which determines a state of a grid which is synchronized with the generator, wherein, when the grid state determination unit determines that a voltage of the grid has decreased, the motor controller ramps down the displacement $D_m$ of the hydraulic motor to an amount required for keeping the generator synchronized with the grid in a few milliseconds.

By this, the torque of the hydraulic motor can be instantaneously changed in response to a reduced load of the generator so as to solve the voltage decline of the grid.

Preferably the motor controller of the wind turbine generator or the tidal current generator sets the displacement $D_m$ of the hydraulic motor based on a measurement of the hydraulic pressure in the high pressure oil line, adjusting the displacement $D_m$ of the hydraulic motor to maintain the hydraulic pressure in the high pressure oil line within an acceptable pressure range.

As an operation method of a wind turbine generator or a tidal current generator in relation to the present invention, an operation method of a wind turbine generator or a tidal current generator which comprises a hub, a main shaft connected to the hub, a generator for converting a rotation energy transmitted from the main shaft to electric power, a hydraulic pump rotated by the main shaft, a hydraulic motor of variable displacement type connected to the generator, a high pressure oil line arranged between a discharge side of the hydraulic pump and an intake side of the hydraulic motor and a low pressure oil line arranged between an intake side of the hydraulic pump and a discharge side of the hydraulic motor, the method comprising: a target torque calculation step of calculating a target torque of the hydraulic pump at which a power coefficient becomes maximum, a pump displacement setting step of setting a displacement $D_p$ of the hydraulic pump based on the target torque calculated in the target torque calculation step and a hydraulic pressure in the high pressure oil line; and a motor displacement setting step of setting a displacement $D_m$ of the hydraulic motor based on a discharge amount $Q_p$ of the hydraulic pump that is obtained from the displacement $D_p$ set in the pump displacement setting step so that a rotation speed of the generator becomes constant, wherein the hydraulic pump and the hydraulic motor are controlled based on the displacement $D_p$ set in the pump displacement setting step and the displacement $D_m$ set in the motor displacement setting step.

According to the operation methods of the wind turbine generator or the tidal current generator, the control of the hydraulic pump is performed by setting the target torque of the hydraulic pump at which a power coefficient becomes maximum, and then setting the displacement $D_p$ of the hydraulic pump based on the target torque and the pressure of operating oil in the high pressure oil line. As a result, the power generation efficiency is improved.

Further, the displacement $D_m$ of the hydraulic motor is set based on the discharge amount $Q_p$ of the hydraulic pump so that the rotation speed of the generator becomes constant, and the discharge amount $Q_p$ of the hydraulic pump is obtained from the displacement $D_p$. Therefore, even when the target torque of the hydraulic pump is changed, the rotation speed of the generator can be kept constant. As a result, the generator can generate electric power having a constant frequency.

Advantageous Effects of Invention

According to the present invention, the control of the hydraulic pump is performed by setting the target torque of the hydraulic pump at which a power coefficient becomes maximum, and then setting the displacement $D_p$ of the hydraulic pump based on the target torque and the pressure of operating oil in the high pressure oil line. As a result, the power generation efficiency is improved.

Further, the displacement $D_m$ of the hydraulic motor is set based on the discharge amount $Q_p$ of the hydraulic pump so that the rotation speed of the generator becomes constant, and the discharge amount $Q_p$ of the hydraulic pump is obtained from the displacement $D_p$. Therefore, even when the target torque of the hydraulic pump is changed, the rotation speed of the generator can be kept constant. As a result, the generator can generate electric power having a constant frequency.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

A general structure of the wind turbine generator in relation to a preferred embodiment is explained hereinafter. As an example of the wind turbine generator, a three-bladed wind turbine is used. However, the preferred embodiment is not limited to this example and can be applied to various types of wind turbines.

Figure 1:
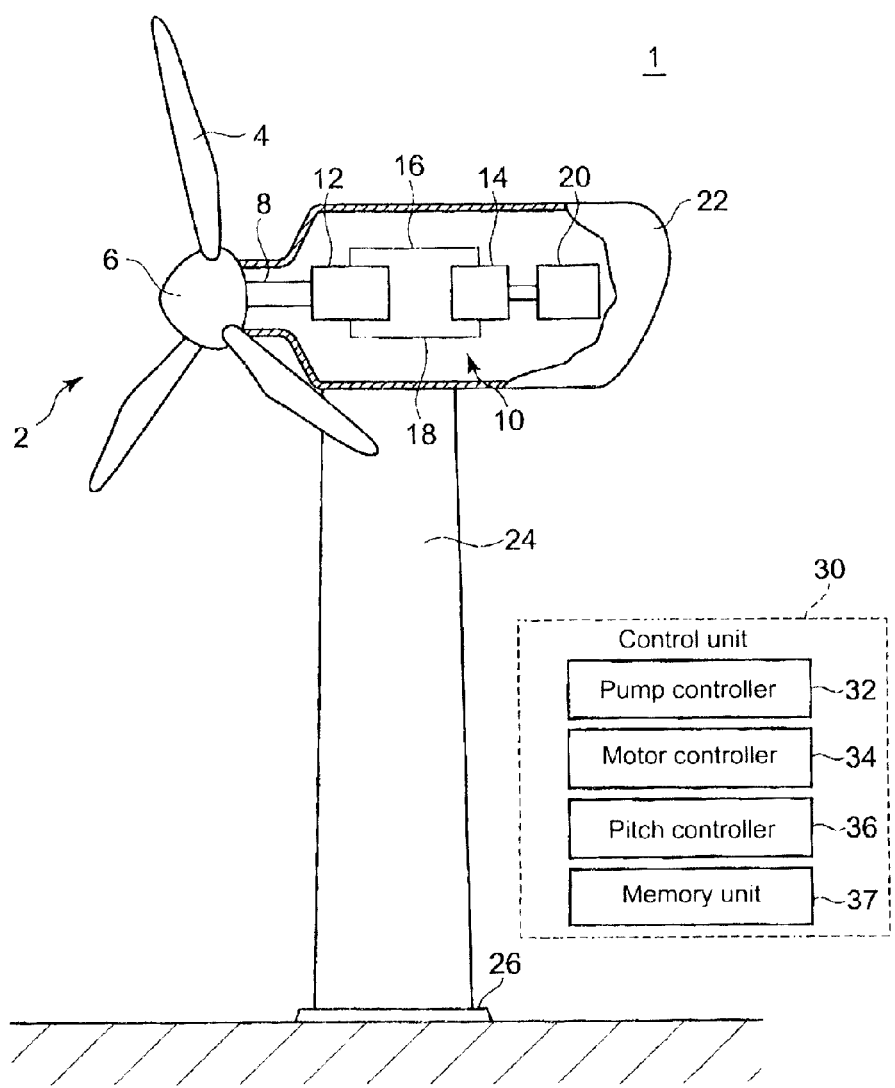
FIG. 1 is a schematic view of an example structure of a wind turbine generator.
Figure 3:
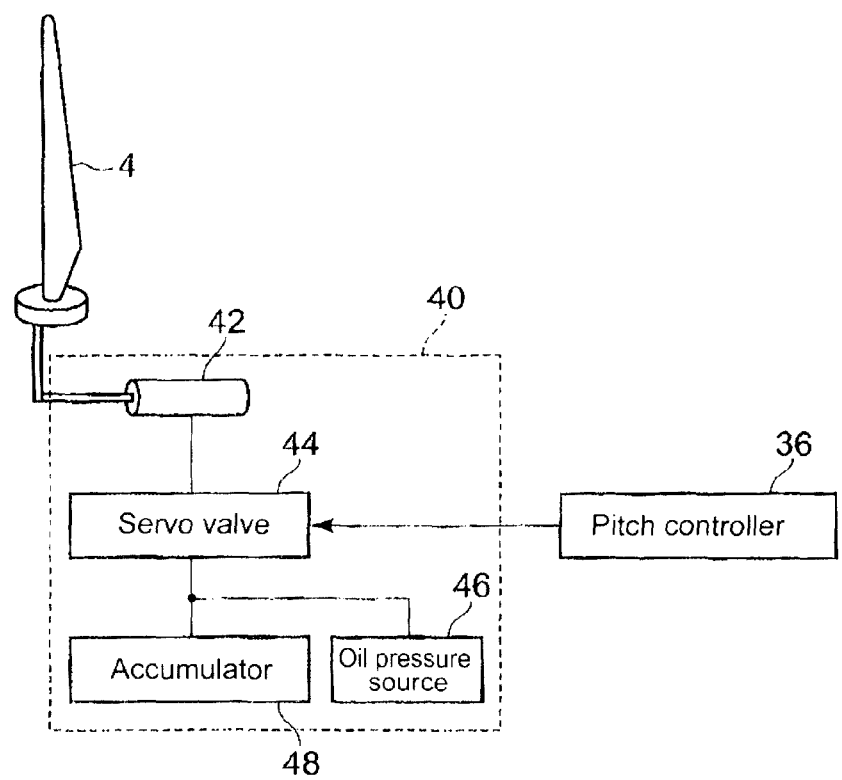
FIG. 3 is an illustration of a structure of a pitch driving mechanism.

FIG. 1 is an illustration of an example structure of a wind turbine generator. FIG. 3 is an illustration of a structure of a pitch driving mechanism.

As illustrated in FIG. 1, a wind turbine generator 1 comprises a rotor 2 rotated by the wind, a hydraulic transmission 10 for increasing rotation speed of the rotor 2, a generator 20 for generating electric power, a nacelle 22, a tower 24 for supporting the nacelle 24, a pump controller 32, a motor controller 34, a pitch controller 36 and a control unit 30 for controlling each unit of the wind turbine generator. The control unit 30 and controllers 32,24,36 may be located in different locations either inside or outside of the nacelle 22, so that the control unit 30 may form a distributed control system. It is also possible that the functions of more than one of the control unit 30 and controllers 32,24,36 may be combined into one computer processing unit.

The rotor 2 is constructed such that a main shaft 8 is connected to a hub 6 having blades 4. Specifically, three blades 4 extend radially from the hub 6 and each of the blades 4 is mounted on the hub 6 connected to the main shaft 8. By this, the power of the wind acting on the blades 4 rotates the entire rotor 2, the rotation of the rotor 2 is inputted to the hydraulic transmission 10 via the main shaft 8. By this, the force of the wind acting on the blade rotates the entire rotor 2 and the rotation of the rotor is inputted to the hydraulic transmission 10 via the main shaft 8.

Figure 2:
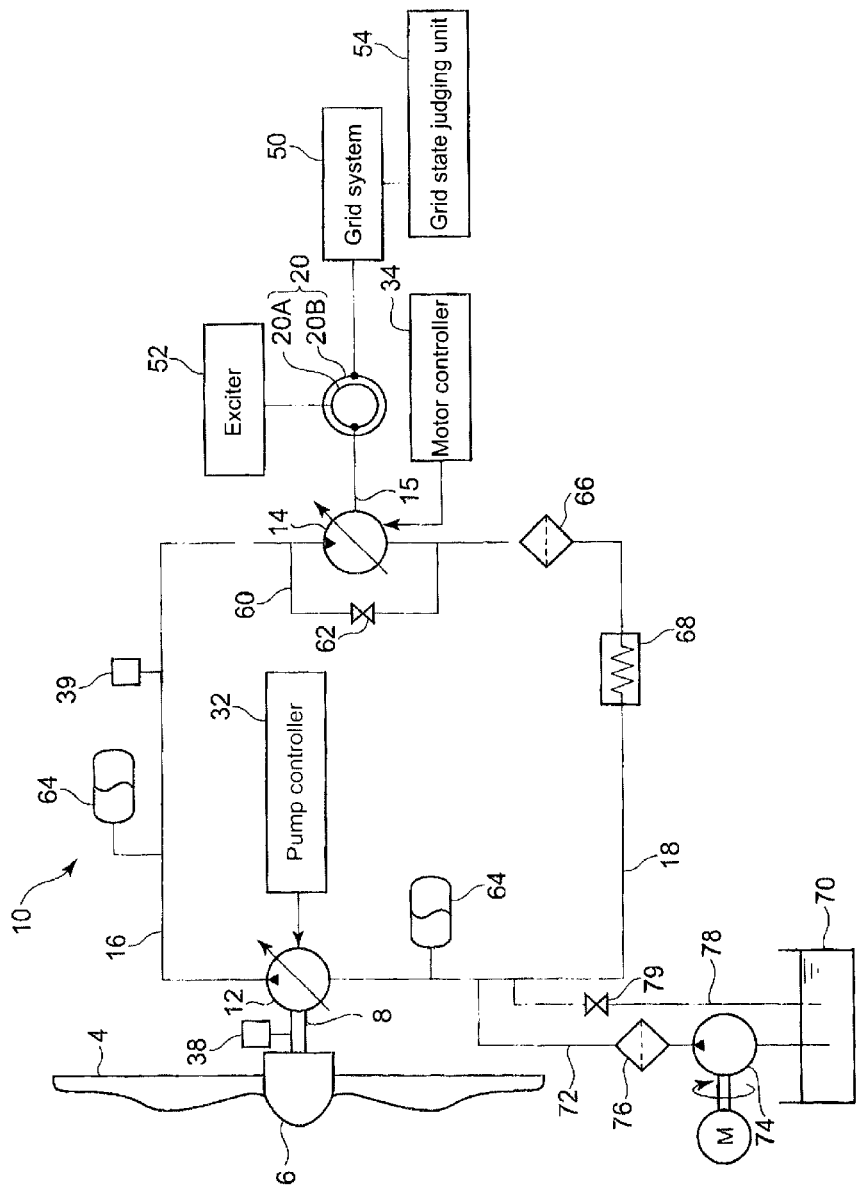
FIG. 2 is a schematic view of a structure of a hydraulic transmission and a generator for a wind turbine generator unit.

As illustrated in FIG. 2, the hydraulic transmission 10 comprises a hydraulic pump 12 of a variable displacement type which is rotated by the main shaft 8, a hydraulic motor 14 of a variable displacement type which is connected to the generator 20, and a high pressure oil line 16 and a low pressure oil line 18 which are arranged between the hydraulic pump 12 and the hydraulic motor 14.

The high pressure oil line 16 connects a discharge side of the hydraulic pump 12 to a intake side of the hydraulic motor 14. The low pressure oil line 18 connects a intake side of the hydraulic pump 12 to a discharge side of the hydraulic motor 14. The operating oil (low pressure oil) discharged from the hydraulic pump flows into the hydraulic motor via the high pressure oil line. The operating oil having worked in the hydraulic motor 14 flows into the hydraulic pump 12 via the low pressure oil line 18 and then the pressure thereof is raised by the hydraulic pump 12 and finally the operating oil flows into the hydraulic motor 14 so as to drive the hydraulic motor 14.

FIG. 2 illustrates an exemplary embodiment in which the hydraulic transmission 10 includes only one hydraulic motor 14. However, it is also possible to provide a plurality of hydraulic motors 14 and connect each of the hydraulic motors 14 to the hydraulic pump 12. The high pressure oil line 16 having one end connected to the discharge side of the hydraulic pump 12, splits along the way to be connected to the intake side of each of the hydraulic motor 14. Meanwhile, the low pressure oil line 18 whose one end is connected to the discharge side of each of the hydraulic motor 14 are joined in the way and connected to the intake side of the hydraulic pump.

Further, a rotation speed meter 38 for measuring the rotation speed of the main shaft 8 and a pressure meter 39 for measuring the pressure in the high pressure oil line 16 are provided. The measurement results of the rotation speed meter 38 and the pressure meter 39 are sent to the control unit 30 to control the hydraulic pump 12 and the hydraulic motor 14.

Furthermore, an anti-pulsation accumulator 64 is provided for the high pressure oil line 16 and the low pressure oil line 18. By this, the pressure fluctuation (pulsation) of the high pressure oil line 16 and the low pressure oil line 18 is suppressed. Moreover, an oil filter 66 for removing impurities from the operating oil and an oil cooler 68 for cooling the operating oil are arranged in the low pressure oil line.

A bypass oil line 60 is arranged between the high pressure oil line 16 and the low pressure oil line 18 to bypass the hydraulic motor 14 and a relief valve 62 is arranged in the bypass oil line 60 to maintain hydraulic pressure of the high pressure oil line 16 not more than a set pressure. By this, the relief valve 62 automatically opens when the pressure in the high pressure oil line 16 reaches the set pressure of the relief valve 62, and the high pressure oil is allowed to escape to the low pressure oil line 18 via the bypass line 60.

Further, the hydraulic transmission 10 has an oil tank 70, a supplementary line 72, a boost pump 74, an oil filter 76, a return line 78 and a low pressure relief valve 79. In some embodiments all or part of the return flow from the hydraulic motor 14 passes through one or more of these units.

The oil tank 70 stores supplementary operating oil. The supplementary line 72 connects the oil tank 70 and the low pressure oil line 18. The boost pump 74 is arranged in the supplementary line 72 so as to replenish the low pressure oil line 18 with the supplementary operating oil from the oil tank 70. In such a case, the oil filter 76 arranged in the supplementary line 72 removes impurities from the operating oil to be supplied to the low pressure oil line 18.

Even when the operating oil leaks in the hydraulic transmission 10, the boost pump 74 replenishes the low pressure oil line with the operating oil from the oil tank 70 and thus, the amount of the operating oil circulating in the hydraulic transmission 10 can be maintained.

The return line 78 is installed between the oil tank 70 and the low pressure oil line 18. The low pressure relief valve 79 is arranged in the return line 78 and the pressure in the low pressure oil line 18 is maintained near the prescribed pressure.

By this, even though the boost pump 74 supplies the operating oil to the low pressure oil line 18, once the pressure in the low pressure oil line 18 reaches the prescribed pressure of the low pressure relief valve 79, the low pressure relief valve 79 automatically opens so as to release the operating oil to the oil tank 70 via the return line 88. Thus, the amount of the operating oil circulating in the hydraulic transmission 10 can be adequately maintained.

The generator 20 is synchronized with the grid 50 such that the electric power generated by the generator 20 is supplied to the grid 50. As FIG. 2 shows, the generator 20 includes an electromagnetic synchronous generator which is constituted of a rotor 20A connected to the output shaft 15 of the hydraulic motor 14 and another rotor 20B connected to the grid 50. An exciter 52 is connected to the rotor 20A of the generator 20 so that the power factor of the electric power generated in the rotor 20B of the generator 20 can be regulated by changing a field current flowing in the rotor 20A. By this, it is possible to supply to the grid 50 the electric power of good quality which is adjusted to the desired power factor.

Further, a grid state determination unit 54 monitors a state of the grid 50. The state of the grid 50 determined by the grid state determination unit 54 is sent to the control unit 30 to be used to control each unit of the wind turbine generator 1. For instance, when the grid state determination unit 54 determines that the voltage of the grid 50 has decreased, the pitch angle of the blade 4 is controlled to the feathering position by the pitch controller 36 (ref. FIG. 1) under the control of the pitch driving mechanism 40 which is described later, and the displacements of the hydraulic pump 12 and the hydraulic motor 14 are reduced by the pump controller 32 and the motor controller 34 to the amount required for keeping the generator 20 synchronized with the grid 40

Further, the grid state determination unit 54 is preferably constituted of a voltage sensor for measuring the voltage of the grid 50. But it is also possible to determine the state of the grid 50 indirectly with use of a power-factor meter or a reactive volt-ampere meter instead of the voltage sensor.

The nacelle 22 shown in FIG. 1 supports the hub 6 of the rotor 2 rotatably and houses a variety of devices such as the hydraulic transmission 10 and the generator 20. Further, the nacelle 22 may be rotatably supported on the tower 24 and be turned by a yaw motor (not shown) in accordance with the wind direction.

The tower 24 is formed into a column shape extending upward from a base 26. For instance, the tower 22 can be constituted of one column member or a plurality of units that are connected in a vertical direction to form a column shape. If the tower 24 is constituted of the plurality of units, the nacelle 22 is mounted on the top-most unit.

The hub 6 houses a pitch driving mechanism 40 for adjusting the pitch angle of the blade 4, as shown in FIG. 3. The pitch driving mechanism 40 is structured by a hydraulic cylinder 42, a servo valve 44, an oil pressure source 46 and an accumulator 48. Under the control of a pitch controller 36, the servo valve 44 adjusts the supply amount of high pressure oil generated by the oil pressure source 46 and high pressure oil stored in the accumulator 48 to the hydraulic cylinder 42 so that the pitch angle of the blade 4 becomes a desired angle.

The control unit 30 of FIG. 1 comprises a pump controller 32 for controlling the hydraulic pump 12, a motor controller 34 for controlling the hydraulic motor 14, a pitch controller 36 for controlling the servo valve 44 of the pitch driving mechanism 40 and a memory unit 37 storing data which is used for the control of the wind turbine generator 1.

The pump controller 32 obtains a target torque of the hydraulic pump 12 at which a power coefficient becomes maximum, and then sets a displacement $D_p$ of the hydraulic pump 12 based on the target torque and the pressure in the high pressure oil line 16. Meanwhile, the motor controller 34 sets a displacement $D_m$ of the hydraulic pump 14 based on a discharge amount $Q_p$ of the hydraulic pump obtained from the displacement $D_p$ of the hydraulic pump 12 so that the rotation seed of the generator 20 becomes constant.

The pitch controller 36 controls the servo valve 44 of the pitch driving mechanism 40 to maintain the rated output of the generator 20 once the output of the generator 20 reaches the rated output, and changes the pitch angle of the blade 4 to the feathering position. By this, the generator 20 can generate a certain amount of output (rated output) of electric power in a rated operation wherein the power generation is carried out at a wind speed which is equal to or higher than the rated wind speed and lower than the cut-out wind speed.

Further, the pitch controller 36 the servo valve 44 of the pitch driving mechanism 40 to change the pitch angle of the blade 4 to the feathering position in such a case that the grid state determination unit 54 determines that the voltage of the grid 50 is decreased.

The memory unit 37 stores a Cp maximum curve and a target pressure setting curve to be used for the control of the wind turbine generator 1.

Figure 4:
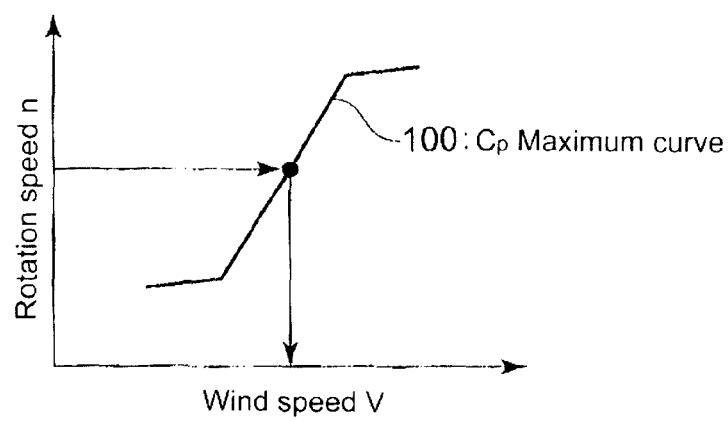
FIG. 4 is a graph showing Cp maximum curve stored in a memory unit of a control unit.
Figure 5:
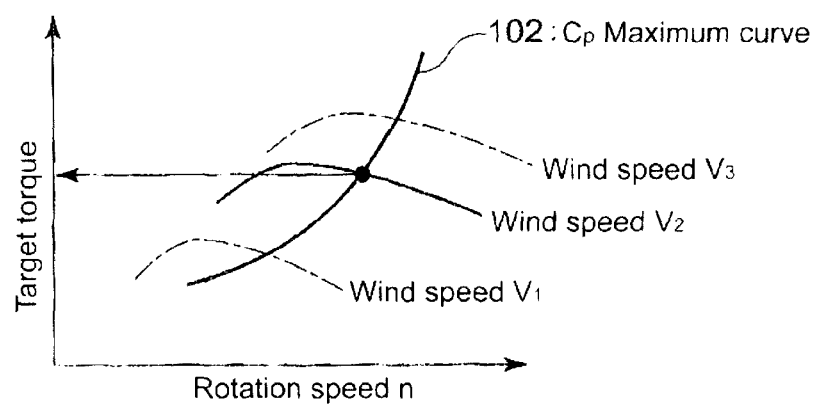
FIG. 5 is a graph showing Cp maximum curve stored in a memory unit of a control unit

FIG. 4 and FIG. 5 are graphs showing Cp maximum curves stored in the memory unit 37. The Cp maximum curves are formed by connecting the points at which the power coefficient Cp becomes maximum. FIG. 4 shows a Cp maximum curve 100 with the wind speed V on the x-axis and the rotation speed n of the main shaft 8 on the y-axis. FIG. 5 shows a Cp maximum curve 102 with the rotation speed n of the main shaft 8 on the x-axis and the target torque of the hydraulic pump 12 on the y-axis.

Figure 6:
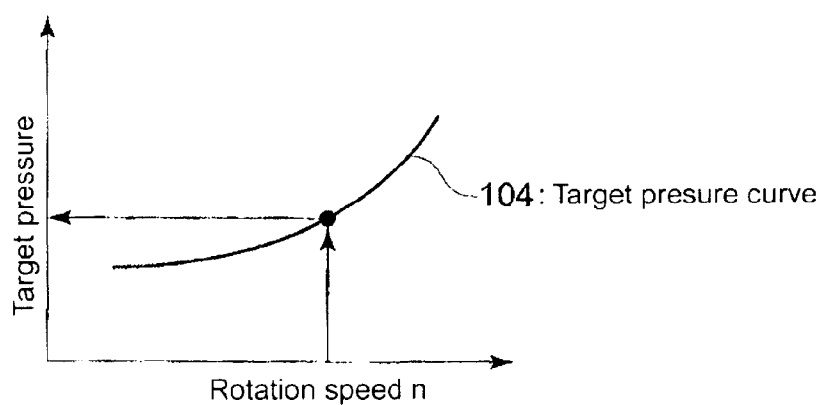
FIG. 6 is a graph showing a target pressure setting curve stored in a memory unit of a control unit.

FIG. 6 is a graph showing a target pressure setting curve 104 stored in the memory unit 37. The target values of the pressure in the high pressure oil line 16 are plotted against the rotation speed n of the main shaft 8, thereby forming the target pressure setting curve 104.

In the target pressure setting curve 104 shown in FIG. 6, the target pressure of the high pressure oil line 16 monotonically increases as the rotation speed n increases. Thus, in comparison to the case wherein the rotation speed n of the main shaft 8 is high, i.e. the discharge amount $Q_p$ of the hydraulic pump is great, the target pressure of the high pressure oil line 16 is set lower in such a case that the rotation speed n of the main shaft 8 is low. By this, the leakage of the operating oil with respect to the discharge amount $Q_p$ of the hydraulic pump in the case of the rotation speed n being small, thereby preventing the leakage of the operating oil from affecting the control of the hydraulic transmission 10.

Figure 7:
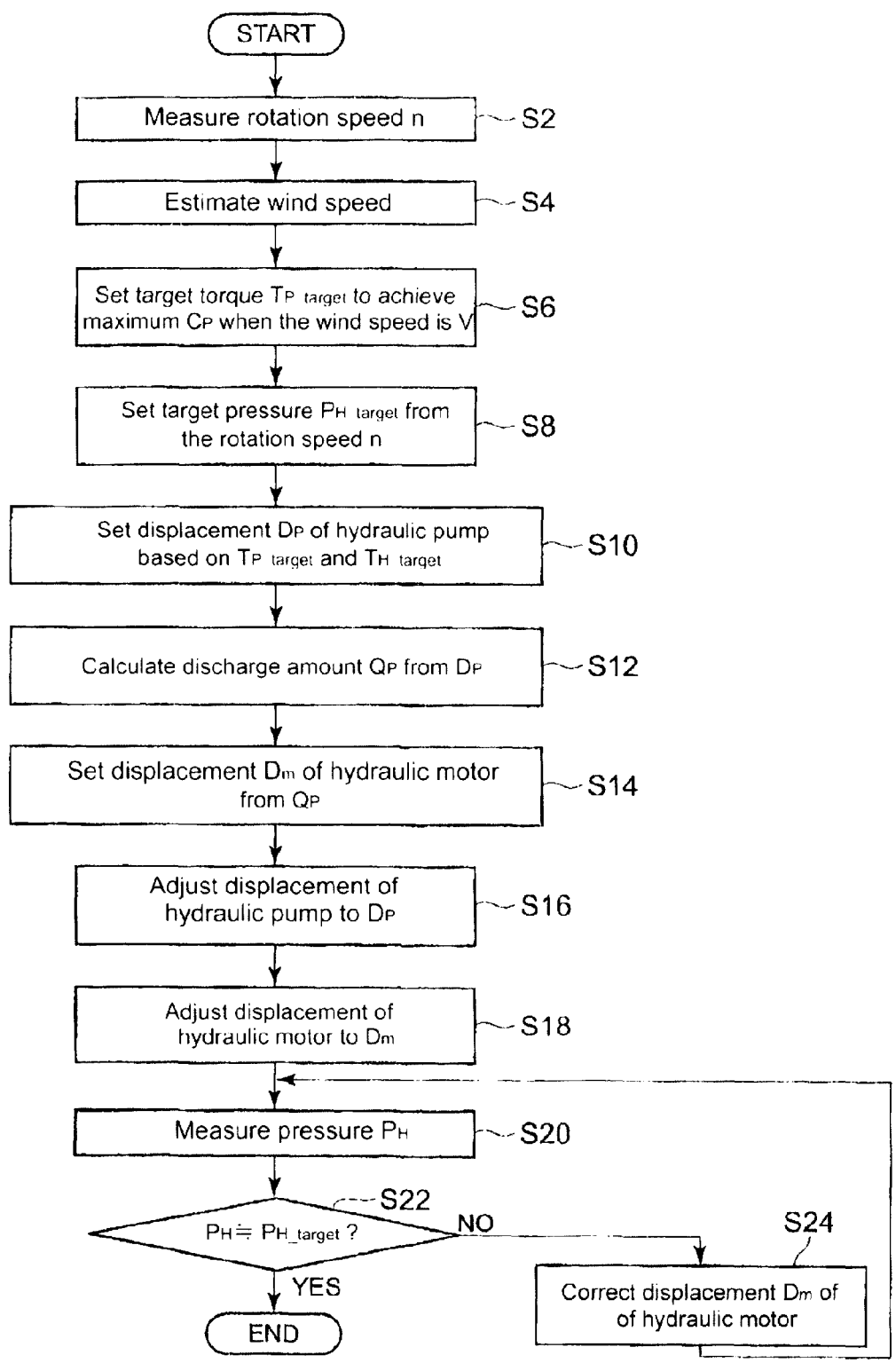
FIG. 7 is a flow chart showing a process of controlling the hydraulic transmission by the control unit.

Next, the control of the hydraulic transmission in the wind turbine generator is explained, FIG. 7 is a flow chart showing a process of controlling the hydraulic transmission 10 under the control of the control unit 30.

As shown in FIG. 7, in a step S2 the rotation speed meter measures the rotation speed n of the main shaft 8.

In a step S4 the pump controller 32 estimates the wind speed V based on the rotation speed n measured by the rotation speed meter 38 in the step S2. Specifically, on the condition that such operation state is maintained that the power coefficient Cp is maximum, the pump controller 32 reads out the Cp maximum curve 100 (ref. FIG. 4) from the memory unit 37 and obtains the wind speed V corresponding to the measured rotation speed n based on the Cp maximum curve 100. Then, in a step S6 the pump controller 32 reads out the Cp maximum curve 102 (ref. FIG. 5) from the memory unit 37 and obtains a target torque $T_{p\_target}$ of the hydraulic pump 12 corresponding to the wind speed V estimated in the step S4. FIG. 5 illustrates the example in which the target torque of the hydraulic pump 12 is obtained in such a case that the wind speed V estimated in the step S2 is $V_2$.

Further, in a step S8 the pump controller 32 reads out the target pressure setting curve 104 (FIG. 6) from the memory unit and obtains a target pressure $T_{H\_target}$ of the high pressure oil line corresponding to the rotation speed n measured by the rotation speed meter 38 in the step S2.

Then, the process advances to a step S10. In the step 10 the pump controller obtains the displacement $D_p$ of the hydraulic pump according to a Math. 1 from the target torque $T_{p\_target}$ of the hydraulic pump 12 and the target pressure $P_{H\_target}$ of the high pressure oil line 16.

$$\text{Displacement } D_P = \text{Target torque } T_{p\_target}/\text{Target pressure } P_{H\_target} \quad (\text{MATH. 1})$$

In a step S12 the pump controller 32 obtains the discharge amount $Q_p$ of the hydraulic pump from the displacement $D_p$ of the hydraulic pump 12 according to a Math. 2 below.

$$\text{Discharge mount } Q_P = \text{Displacement } D_P \times \text{Rotation speed } n \quad (\text{MATH. 2})$$

After the discharge amount $Q_p$ of the hydraulic pump 12 in the step S12, in a step S14 the displacement $D_m$ of the hydraulic motor 14 is set so that the rotation speed of the generator 20 becomes a prescribed value (e.g. 1500 rpm or 1800 rpm) according to a Math. 3 below.

$$\text{Displacement } D_m = \text{Discharge Amount } Q_P/\text{Rotation speed } n_g \text{ of generator } 20 \quad (\text{MATH. 3})$$

Next, in a step S16 the displacement $D_p$ of the hydraulic pump 12 is adjusted. In a step S18 the motor controller 34 adjust the displacement $D_m$ of the hydraulic motor 14. The process of adjusting the displacements of the hydraulic pump 12 and the hydraulic motor 14 is explained more specifically later.

In a step S20 the pressure meter 39 measures the pressure $P_H$ in the high pressure oil line 16. In a step S22 it is determined if a difference between the pressure $P_H$ of the high pressure oil line 16 measured by the pressure meter 39 and the target pressure $P_{H\_target}$ of the high pressure oil line is within an allowable range.

If it is determined that the difference between the pressure $P_H$ of the high pressure oil line 16 measured by the pressure meter 39 and the target pressure $P_{H\_target}$ of the high pressure oil line is beyond the allowable range, in a step S24 the motor controller 34 corrects the displacement Dm of the hydraulic motor 14. Specifically, in such a case that the pressure $P_H$ is smaller than the target pressure $P_{H\_target}$, the displacement $D_m$ of the hydraulic motor 14 is decreased by an amount proportional to the difference between the pressure $P_H$ and the target pressure $P_{H\_target}$. In contrast, in such a case that the pressure $P_H$ is greater than the target pressure $P_{H\_target}$, the displacement $D_m$ of the hydraulic motor 14 is increased by an amount proportional to the difference between the pressure $P_H$ and the target pressure $P_{H\_target}$. The hydraulic pump 12 displacement may also vary in response to the changing actual measurement value of the pressure of the high pressure oil line 16, as described below.

FIG. 7 shows the example in which the target $T_{p\_target}$ of the hydraulic pump 12 is obtained from the wind speed V which is estimated based on the rotation speed n of the main shaft 8 in the step S4. But it is also possible to directly obtain the target torque $T_{p\_target}$ of the hydraulic pump 12 from the rotation speed n measured by the rotation speed meter 38 according to the Cp maximum curve Further, in the example of FIG. 7, the displacement $D_p$ of the hydraulic pump 12 is obtained from the target torque $T_{p\_target}$ of the hydraulic pump and the target pressure $P_{H\_target}$ of the high pressure oil line 16. But it is also possible to use the actual measurement value of the pressure of the high pressure oil line 16 instead of the target pressure $P_{H\_target}$ of the high pressure oil line 16 to obtain the displacement $D_p$ of the hydraulic pump 12.

Figure 8:
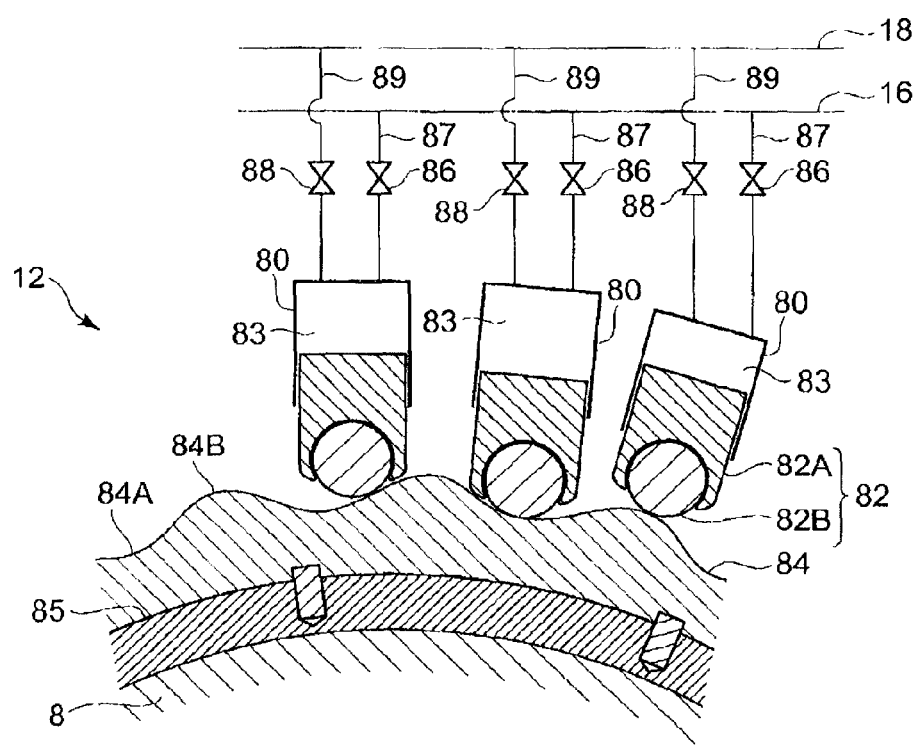
FIG. 8 is an illustration of a detailed structure of the hydraulic pump.
Figure 9:
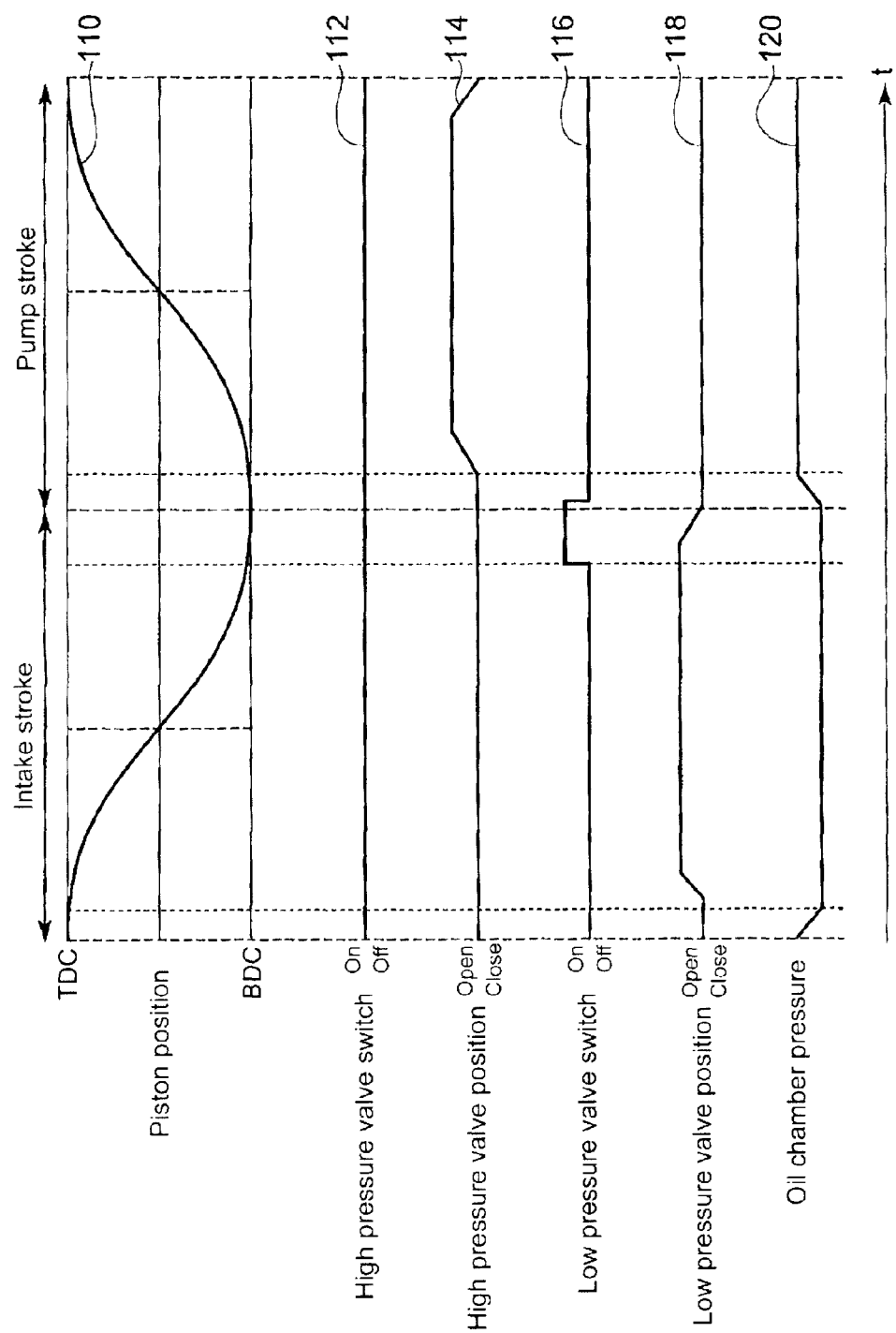
FIG. 9 is a graph showing an opening and closing timing of a high pressure valve and a low pressure valve of the hydraulic pump.
Figure 10:
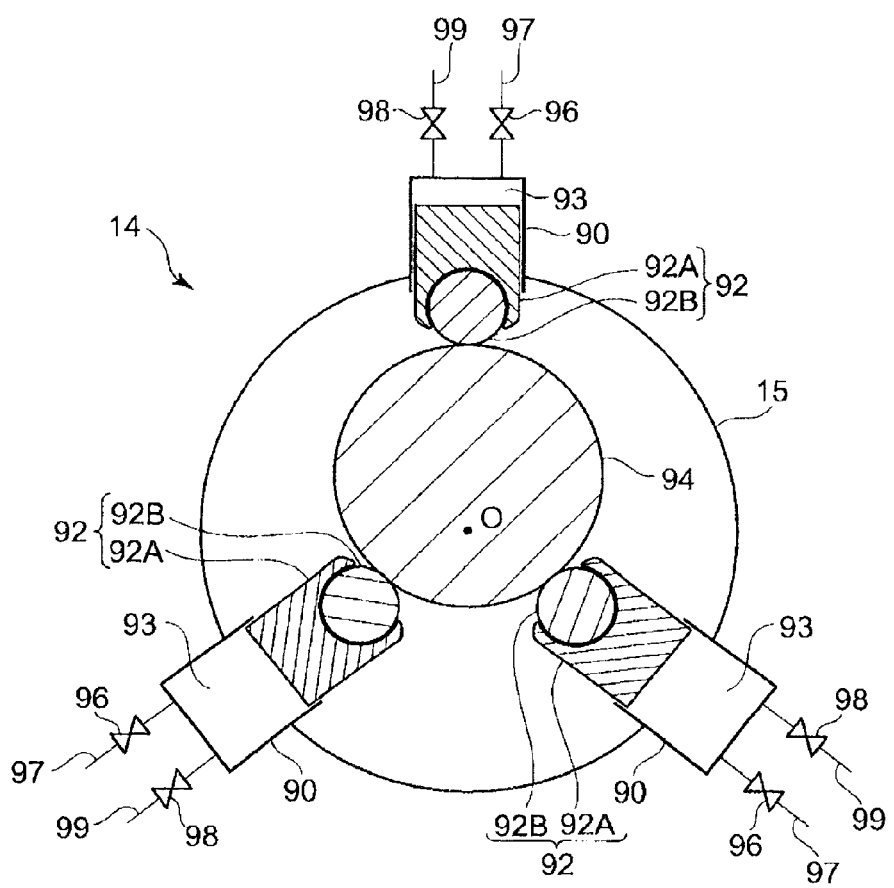
FIG. 10 is an illustration of a detailed structure of the hydraulic motor.
Figure 11:
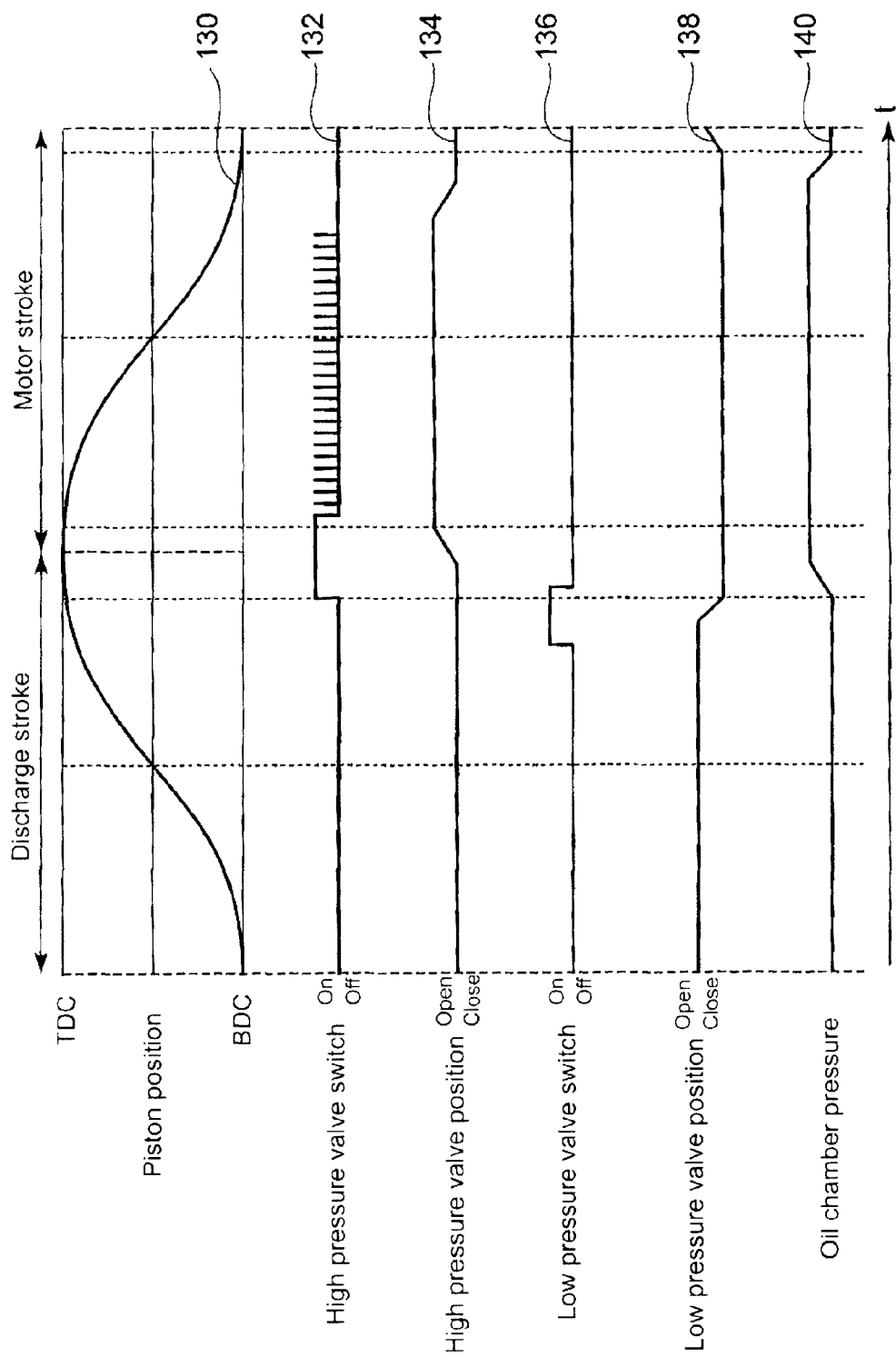
FIG. 11 is a graph showing an opening and closing timing of a high pressure valve and a low pressure valve of the hydraulic motor.

Next, the process of adjusting the displacements of the hydraulic pump 12 and the hydraulic motor 14 in the wind turbine generator is explained. FIG. 8 is an illustration of a detailed structure of the hydraulic pump 12. FIG. 9 is a graph showing an opening and closing timing of one high pressure valve and one low pressure valve of the hydraulic pump 12 during one active cycle of an oil chamber. FIG. 10 is an illustration of a detailed structure of the hydraulic motor 14. FIG. 11 is a graph showing an opening and closing timing of one high pressure valve and one low pressure valve of the hydraulic motor 14 during one active cycle of an oil chamber.

As shown in FIG. 8, The hydraulic pump 12 comprises a plurality of oil chambers 83 each of which is formed by a cylinder 80 and a piston 82, a cam 84 having a cam profile which is in engagement with the piston 82 and a high pressure valve 86 and a low pressure valve 88 which are provided for each of the oil chambers 83.

From the perspective of operating the pistons 82 smoothly along the cam profile of the cam 84, each of the pistons 82 preferably comprises a piston body 82A which moves slidingly in the cylinder 80 and a piston roller or a piston shoe which is mounted on the piston body 82A and engages with the cam profile of the cam 84. FIG. 3 illustrates an example in which the piston 82 is constituted of the piston body 82A and the piston roller 82B. Pressure in the oil chamber 83 keeps the piston roller 82B in contact with the cam 84.

The cam 84 is installed on an outer circumference of the main shaft 8 via a cam mount 85. For one rotation of the main shaft 8, the cam 84 moves each of the pistons 82 upward and downward many times, thereby increasing the torque of the hydraulic pump 12. From this point of view, the cam 84 is preferably a ring cam that has a cam profile defining a plurality of waves with concave portions 84A and convex portions 84B that are alternately disposed around the main shaft 8.

The high pressure valve 86 is a check valve that is arranged in a high pressure communication path 87 between the high pressure oil line 16 and each of the oil chambers 83 and allows only oil flow from the oil chambers 83 to the high pressure oil line 16. Meanwhile, the low pressure valve 88 is a normally opened poppet solenoid valve that is arranged in a low pressure communication path 89 between the low pressure oil line 18 and each of the oil chambers 83.

In the hydraulic pump 12, the cam 84 rotates with the main shaft 8 and as shown in a piston cycle curve 110 of FIG. 9, the pistons 82 is periodically moved upward and downward to repeat a pump cycle of the pistons 82 starting from the bottom dead center and reaching the top dead center and a intake cycle of the pistons starting from the top dead center and reaching the bottom dead center.

The piston cycle curve 110 of FIG. 9 has time on the x-axis and the position of the piston 82 on the y-axis. In the figure, HPV voltage signal 112 is a voltage signal to be supplied to the high pressure valve 86, a high valve position 114 is the opening/closing state of the high pressure valve 86, LPV voltage signal 116 is a voltage signal to be supplied to the low pressure valve 88, a low pressure valve position 118 is the opening/closing state of the low pressure valve 88 and a pressure curve 120 is the pressure in the oil chamber 83.

The pump controller 32 changes the number of disabled oil chambers so as to achieve the desired displacement $D_p$ of the hydraulic pump 12, the disabled oil chambers being kept such that during a cycle of the piston 82 of the hydraulic pump 12 starting from a bottom dead center, reaching a top dead center and returning to the bottom dead center, the high pressure valve 86 of the hydraulic pump 12 is closed and the low pressure valve 88 of the hydraulic pump 12 remains open. Specifically, the pump controller 32 sets the number of disabled chambers from the displacement $D_p$ of the hydraulic pump 12 according to a Math. 4 below, according to which the hydraulic pump is controlled.

$$\text{Displacement } D_p = m \times V_p \times F_{dp} \quad \text{(MATH. 4)}$$

In the Math. 4, m is the number of concave portions (or convex) portions of the cam 84. $V_p$ is the total capacity of all of the cylinders 80. $F_{dp}$ is a ratio of working chambers to all of the oil chambers 83. $F_{dp}$ may be determined over a period of time, such that $F_{dp}$ is the short-term average of the ratio of working chambers to all of the oil chambers. Herein, "disabled chamber" of the hydraulic pump 12 refers to an oil chamber 83 which does not discharge the operating oil to the high pressure oil line 16 during the pump stroke of the piston 82 starting from the bottom dead center and reaching the top dead center, while "working chamber" of the hydraulic pump 12 refers to a oil chamber 83 which discharge the operating oil to the high pressure oil line during the pump stroke of the piston 82 starting from the bottom dead center and reaching the top dead center.

The state of each oil chamber 83 (working chamber or disabled chamber) can be switched every cycle in which the piston 82 completes one set of upward and downward motions. Therefore, the displacements of the hydraulic pump 12 can be promptly changed by changing the ratio of disabled chambers to all of the oil chambers 83.

The pump controller 32 controls the opening/closing of the high pressure valve 86 and the low pressure valve 88 for both the disabled chambers and working chambers of the hydraulic pump 12 in the manner described below.

As for the disabled chamber of the hydraulic pump 83, the low pressure valve 88 of normally open type is de-energized to keep the low pressure valve 88 open while the piston completes a set of upward and downward motions. By this, even when the piston 82 moves upward and downward, the operating oil simply moves between the oil chamber 83 and the low pressure oil line without raising the pressure in the oil chamber 83 and thus, the high pressure check valve 86 is kept closed.

On the other hand, as for the working chamber of the oil chamber 83, the opening and closing of the high pressure valve 86 and the low pressure valve 88 is controlled to the upward and downward motions of the piston 82 as illustrated in FIG. 9.

As the high pressure valve 86 is constituted of the check valve, the voltage signal cannot be supplied and thus, the HPV voltage signal 112 is always zero. But the pressure difference between the oil chamber 83 and the high pressure oil line 16 causes the pressure valve 86 to automatically open or close. Specifically, as the high pressure valve position 114 shows, the pressure in the oil chamber 83 rises during the pump cycle (ref. pressure curve 120) and once the pressure in the oil chamber 83 exceeds the pressure of the high pressure oil line 16, the high pressure valve 86 is automatically opened and then automatically closed after the pump stroke.

As for the low pressure valve 88 of normally open type, such LPV voltage signal is applied, as to energize the low pressure valve 88 immediately before the piston 82 reaches the bottom dead center and de-energize the low pressure valve 88 immediately after the piston 82 reaches the bottom dead center. As understood from the low pressure valve position 118, the low pressure valve 88 is closed by energizing the low pressure valve 88 immediately before the piston 82 reaches the bottom dead center. In other embodiments, a normally-closed solenoid valve could be used.

Further, even when the low pressure valve 88 is de-energized immediately after the piston 82 reaches the bottom dead center, the low pressure valve 88 is kept closed by the pressure difference between the oil chamber 83 and the low pressure oil line 18 as the pressure in the oil chamber 83 remains high until the piston reaches the top dead center. Subsequently, the piston 82 reaches the top dead center and the process moves to the intake cycle. During the intake cycle, due to the closure of the high pressure valve 86, the pressure in the oil chamber 83 decreases and thus the pressure difference between the oil chamber 83 and the low pressure oil line 18 becomes small, thereby causing the low pressure valve 88 to open automatically.

As the high pressure valve 86 of the hydraulic pump 12 is the check valve, the operating oil in the oil chamber 83 is compressed during the cycle of the piston 82 of the hydraulic pump 12 starting from the bottom dead center and reaching the top dead center. As a result, the pressure in the oil chamber 83 becomes higher than the pressure in the high pressure oil line 16, thereby causing the high pressure valve 86 to open automatically. Thus, there is no need to control the high pressure valve 86 positively. Further, the high pressure valve 86 of the hydraulic pump 12 is the check valve with the structure that is simpler than that of the solenoid valve, and thus the size of the hydraulic pump 12 can be made smaller.

Furthermore, while controlling the opening and closing of the high pressure valve 86 and the low pressure valve 88 in the working chamber of the oil chamber 83, the low pressure valve 88 is de-energized immediately after piston 82 reaches the bottom dead center and after this, the low pressure valve 88 is closed by the pressure difference between the oil chamber 83 and the low pressure oil line 18. As a result, it is possible to save the electric power for energizing the low pressure valve 88.

As illustrated in FIG. 10, the hydraulic motor 14 comprises a plurality of hydraulic chambers 93 formed between cylinders 90 and pistons 92, a cam 94 having a cam profile which engages with the pistons 92, and a high pressure valve 96 and a low pressure valve 98 that are provided for each of the hydraulic chambers 93.

From the perspective of converting the upward and downward motion of the pistons 92 smoothly to the rotary motion of the cam 94, each of the pistons 92 preferably comprises a piston body 92A which moves slidingly in the cylinder 90 and a piston roller or a piston shoe which is mounted on the piston body 92A and engages with the cam profile of the cam 94. FIG. 10 illustrates the example in which each of the pistons 92 is constituted of the piston body 92A and the piston roller 92B.

The cam 94 is an eccentric cam that is disposed eccentrically with respect to a shaft center O of the output shaft (crank shaft) 15 of the hydraulic motor 14 connected to the generator 20. While the pistons 92 complete one set of upward and downward motions, the cam 94 and the output shaft 15 on which the cam 94 is mounted, complete one rotation.

As described above, the cam 84 of the hydraulic pump 12 is the ring cam and the cam 94 of the hydraulic motor 14 is the eccentric cam so that the displacement of the hydraulic motor 14 is smaller than that of the hydraulic pump 12 to achieve a high speed increasing ratio of the hydraulic transmission 10.

The high pressure valve 96 is a poppet solenoid valve of normally closed type that is arranged in a high pressure communication path 97 between the high pressure oil line 16 and each of the oil chambers 93. The high pressure valve 96 could be a normally open type. Meanwhile, the low pressure valve 98 is a poppet solenoid valve of normally open type that is arranged in a low pressure communication path 99 between the low pressure oil line 18 and each of the oil chambers 93. The low pressure valve 98 could be a normally closed type.

In the hydraulic motor 14 as shown with a piston cycle curve 130, the pistons 92 is periodically moved upward and downward to repeat a motor cycle of the pistons 92 starting from the top dead center and reaching the bottom dead center and a discharge cycle of the pistons starting from the bottom dead center and reaching the top dead center.

The piston cycle curve 130 of FIG. 11 has time on the x-axis and the position of the piston 92 on the y-axis. In the figure, HPV voltage signal 132 is a voltage signal to be supplied to the high pressure valve 96, a high valve position 134 is the opening/closing state of the high pressure valve 96, LPV voltage signal 136 is a voltage signal to be supplied to the low pressure valve 98, a low pressure valve position 138 is the opening/closing state of the low pressure valve 98 and a pressure curve 140 is the pressure in the oil chamber 93.

The motor controller 34 changes the number of disabled oil chambers so as to achieve the desired displacement $D_m$ of the hydraulic motor 14, the disabled oil chambers being kept such that during a cycle of the piston 92 of the hydraulic motor 14 starting from the bottom dead center, reaching the top dead center and returning to the bottom dead center, the high pressure valve 896 of the hydraulic motor 14 is closed and the low pressure valve 98 of the hydraulic motor 14 remains open. Specifically, the motor controller 34 sets the number of disabled chambers from the displacement $D_m$ of the hydraulic motor 14 according to a Math. 5 below, according to which the hydraulic motor 14 is controlled.

$$\text{Displacement } D_m = V_m \times F_{dm} \quad \text{(MATH. 5)}$$

In the Math. 5, $V_m$ is the total capacity of all of the cylinders 90 and $F_{dm}$ is a ratio of working chambers to all of the oil chambers 893. $F_{dm}$ may be determined over a period of time, such that $F_{dm}$ is the short-term average of the ratio of working chambers to all of the oil chambers.

Herein, "disabled chamber" of the hydraulic motor 14 refers to an oil chamber 93 to which the operating oil is not supplied from the high pressure oil line 16 during the motor stroke of the piston 92 starting from the top dead center and reaching the bottom dead center, while "working chamber" of the hydraulic motor 14 refers to a oil chamber 83 to which the operating oil is supplied from the high pressure oil line 16 during the motor stroke of the piston 92 starting from the top dead center and reaching the bottom dead center.

The state of each oil chamber 93 (working chamber or disabled chamber) can be switched every cycle in which the piston 92 completes one set of upward and downward motions. Therefore, the displacements of the hydraulic motor 14 can be promptly changed by changing the ratio of disabled chambers to all of the oil chambers 93.

The motor controller 34 controls the opening/closing of the high pressure valve 96 and the low pressure valve 98 for both the disabled chambers and working chambers of the hydraulic motor 14 in the manner described below.

As for the disabled chamber of the oil chambers 93, the high pressure valve 96 of normally close type is de-energized to keep the high pressure valve 96 closed while the piston 92 completes a set of upward and downward motions and the low pressure valve 98 of normally open type is de-energized to keep the low pressure valve 98 open.

On the other hand, as for the working chamber of the oil chamber 93, the opening and closing of the high pressure valve 96 and the low pressure valve 98 is controlled to the upward and downward motions of the piston 92 as illustrated in FIG. 11.

As for the high pressure valve 96 of normally close type, such HPV voltage signal 132 is applied, as understood from the high pressure valve position 134, the high pressure valve 96 is opened by being energized immediately before the piston 92 reaches the top dead center.

Once the high pressure valve 96 is opened, the high pressure oil flows into the oil chamber 93 to drive the cam 94 around. It only requires a small force to overcome the biasing force (force acting in the direction to close the high pressure valve 96) of a spring housed in the high pressure valve 96 to latch the high pressure valve 96 in an open state. In this manner, after the piston 92 reaches the top dead center, the high pressure valve 96 can be latched in the open state by a reduced current, achieved by repeatedly energizing and de-energizing the high pressure valve 96 at a very high frequency. For example, a 20% duty cycle at 10 kHz could be used. In this case, from the perspective of securing that the high pressure valve 96 is kept in the open state, the voltage signal applied to the high pressure valve 96 is preferably a pulsing voltage signal having a higher frequency that the reciprocal of time constant of a coil of the high pressure valve 96.

By stopping the supply of the pulsing voltage signal for energizing/de-energizing the high pressure valve 96, the high pressure valve 96 is closed by the biasing force of the spring of the high pressure valve 96.

As for the low pressure valve 98 of normally open type, such LPV voltage signal 136 is applied, as to energize the low pressure valve 98 immediately before the piston 92 reaches the top dead center and then de-energize the low pressure valve 98 immediately after the high pressure valve 96 is energized. As understood from the low pressure valve position 138, the low pressure valve 98 is closed by being energized immediately before the piston 92 reaches the top dead center.

Once the low pressure valve 98 is closed by being energized, even if the low pressure valve 98 is de-energized before the piston 92 reaches the top dead center, the low pressure valve 98 is maintained closed. This is because the pressure in the oil chamber 93 (ref. pressure curve 140) is high in a period in which the piston 92 is moving to the top dead center (a period of the discharge cycle, which is after closing the low pressure valve 98) and thus the low pressure valve 98 is kept closed by the pressure difference between the oil chamber 93 and the low pressure oil line 18. And when the piston 92 reaches the top dead center and the process moves to the motor cycle, the high pressure oil flows into the oil chamber 93 via the high pressure valve 96. The pressure in the oil chamber 93 is still kept high and thus, the low pressure valve 98 is maintained closed by the pressure difference between the oil chamber 93 and the low pressure oil line 18.

Subsequently, if the pulsing voltage signal to the high pressure valve 96 is stopped immediately before the piston 92 reaches the bottom dead center, the high pressure valve 96 is closed and the pressure in the oil chamber 93 is decreased. As a result of the continued expansion of the oil chamber, the pressure difference between the oil chamber 93 and the low pressure oil line 18 becomes small and the low pressure valve 98 automatically opens.

As described above, after the piston 92 of the hydraulic motor 14 reaches the top dead center, the high pressure valve 96 is repeatedly energized and de-energized until immediately before the piston 92 reaches the bottom dead center. By this, it is possible to latch the high pressure valve in the open state while saving the electric power used to energize the high pressure valve 96.

Furthermore, the low pressure valve 98 is energized immediately before piston 92 reaches the top dead center and then de-energized. After this, the low pressure valve 98 is closed by the pressure difference between the oil chamber 93 and the low pressure oil line 18. As a result, it is possible to save the electric power for energizing the low pressure valve 98.

As described above, in the preferred embodiment, the pump controller 32 obtains the target torque $T_{p\_target}$ of the hydraulic pump 12 at which the power coefficient becomes maximum, sets the displacement $D_p$ of the hydraulic pump 12 based on the target torque $T_{p\_target}$ and the pressure PH in the high pressure oil line 16, and controls the hydraulic pump 12. As a result, the power generation efficiency is improved.

Moreover, the motor controller 34 sets the displacement $D_m$ of the hydraulic motor 14 based on the discharge mount $Q_p$ of the hydraulic pump 12 so that the rotation speed of the generator 20 becomes constant and controls the hydraulic pump 14. As a result, the rotation speed of the generator can be kept constant even when the target torque $T_{p\_target}$ of the hydraulic pump 12 changes. Thus, the electric power having constant frequency can be produced in the generator 20.

While the present invention has been described with reference to exemplary embodiments, it is obvious to those skilled in the art that various changes may be made without departing from the scope of the invention.

For instance, the above preferred embodiment uses the exemplary case in which the present invention is applied to the wind turbine generator. But the present invention is also applicable to a tidal current generator. A "tidal current generator" herein refers to a generator which is installed in places such as sea, a river and a lake and utilizes tidal energy. The tidal current generator has the same basic structure as the wind turbine generator 1 except that the rotor 2 is rotated by the tidal current instead of the wind. The tidal current generator comprises the rotor 2 rotated by the tidal current, the hydraulic transmission 10 for increasing the rotation speed of the rotor 2, the generator 20 for generating electric power and the control unit 30 which comprises the pump controller 32, the motor controller 34 and the memory unit 37 and controls each unit of the tidal current generator. The same reference numbers are used here to explain the components that are common to the wind turbine generator 1.

Herein, the control unit 10 of the tidal current generator sets the target torque of the hydraulic pump at which a power coefficient becomes maximum, and then sets the displacement $D_p$ of the hydraulic pump based on the target torque and the pressure of operating oil in the high pressure oil line so as to control the hydraulic pump 12. As a result, the power generation efficiency is improved. Further, the displacement $D_m$ of the hydraulic motor 14 is set based on the discharge amount $Q_p$ of the hydraulic pump so that the rotation speed of the generator becomes constant, and the discharge amount $Q_p$ of the hydraulic pump is obtained from the displacement $D_p$. Therefore, even when the target torque of the hydraulic pump 12 is changed, the rotation speed of the generator 20 can be kept constant. As a result, the generator 20 can generate electric power having a constant frequency.

Furthermore, in the case of using the tidal current generator, the target torque of the hydraulic pump 12 may be obtained based on the speed of the tidal current measured by the speed meter instead of the wind speed measured by the anemometer, with use of the Cp maximum curve 102 base on the Cp maximum curve 102 (ref. FIG. 5).

In the above embodiment, the rotation speed meter 38 measures the rotation speed n of the main shaft 8 and based on the rotation speed n of the main shaft 8, the target torque of the hydraulic pump is obtained. However, it is also possible to obtain the target torque of the hydraulic pump 12 based on the wind speed V measured by the anemometer with use of the Cp maximum curve 102 (ref. FIG. 5). In that case, one anemometer may be provided for each of the wind turbine generator or one anemometer can be used for a plurality of the wind turbine generators 1. And the anemometer may be mounted on the nacelle 22.

Further, in the above preferred embodiment, the displacements of the hydraulic pump 12 and the hydraulic motor 14 are adjusted so that the power coefficient Cp is maximum and the rotation speed of the generator is constant. But it is also possible to adjust the displacements of the hydraulic pump 12 and the hydraulic motor 14 to reduce the rotation speed of the main shaft 8 in the time of an emergency stop of the wind turbine generator 1.

Specifically, when the wind turbine generator 1 needs to be shut down for an emergency stop, the pump controller 32 changes all of the oil chambers 83 of the hydraulic pump 12 into working chambers, i.e. makes the number of disabled oil chambers to zero, so as to maximize the displacement $D_p$ of the hydraulic pump 12. Further, the motor controller may increase the number of disabled oil chambers of the hydraulic motor 14 so as to reduce the displacement $D_m$ of the hydraulic motor 14. By this, the displacement $D_p$ of the hydraulic pump 12 exceeds the displacement $D_m$ of the hydraulic motor 14 and the pressure in the high pressure oil line 16 is raised to the set pressure value of the relief valve 62. As a result, the torque needed for rotating the hydraulic pump 12 is increased and the rotation speed of the main shaft 8 can be promptly reduced.

Further, in the above preferred embodiment, the ratio of the disabled chambers to all of the oil chambers (83, 93) is changed to adjust the displacements of the hydraulic pump 12 and the hydraulic motor 14. But it is also possible to change the displacements of the hydraulic pump 12 and the hydraulic motor 14 by changing the timing of opening the high pressure valve 86, 96) during the piston cycle. For example, it is possible in FIG. 11 to change the timing to stop the pulsing voltage signal (HPV voltage signal 132) for energizing and de-energizing the high pressure valve 96 of the hydraulic motor 14 so as to adjust the timing of opening the high pressure valve 96 during the motor cycle.

In the similar manner, in the hydraulic pump 12, the low pressure valve 88 may be closed later in the stroke from bottom dead center to top dead center, to thereby adjust the time when the high pressure valve 86 is opened and thus the displacement $D_p$ of the hydraulic pump 12 can be varied.

In this manner, by changing the timing to open the high pressure valve (86, 96) during the piston cycle, the displacements of the hydraulic pump 12 and the hydraulic motor 14 can be changed continuously (not discretely) within the variable range. Furthermore, in the operation of the hydraulic pump 12 and the hydraulic motor 14, the displacements of the hydraulic pump 12 and the hydraulic motor 14 can be changed immediately no matter where the piston (82m 92) is positioned within each of the oil chambers (83, 93) when the signal for changing the displacements is transmitted by the pump controller 32 or the motor controller.

Particularly, with the configuration such that the displacement $D_m$ can be adjusted by changing the timing to open the high pressure valve 96 of the hydraulic motor, when the determination unit 54 determines that a voltage of the grid 50 has decreased, the displacement $D_m$ of the hydraulic motor can be ramped down promptly to an amount required for keeping the generator 20 synchronized with the grid 50. By this, the torque of the hydraulic motor 14 can be instantaneously changed in response to a reduced load of the generator 20 so as to solve the voltage decline of the grid 50.

REFERENCE SIGNS LIST 1 wind turbine generator
2 rotor
4 blade
6 hub
8 main shaft
10 hydraulic transmission
12 hydraulic pump
14 hydraulic motor
16 high pressure oil line
18 low pressure oil line
20 generator
22 nacelle
24 tower
26 base
30 control unit
32 pump controller
34 motor controller
36 pitch controller
37 memory unit
40 pitch driving mechanism
42 hydraulic cylinder
44 servo valve
46 oil pressure source
48 accumulator
50 grid system
52 exciter
54 grid state judging unit
60 bypass line
62 relief valve
64 anti-pulsation accumulator
66 oil filter
68 oil cooler
70 oil tank
72 supplementary line
74 boost pump
76 oil filter
78 return line
79 low pressure relief valve 80 cylinder
82 piston
82A piston body
82B piston roller
83 oil chamber
84 cam
86 high pressure valve
87 high pressure communication path
88 low pressure valve
89 low pressure communication path
90 cylinder
92 piston
92A piston body
92B piston roller
93 oil chamber
94 cam
96 high pressure valve
97 high pressure communication path
98 low pressure valve
99 low pressure communication path
100 Cp maximum curve
102 Cp maximum curve
104 target pressure curve
110 piston cycle curve
112 HPV voltage signal
114 high pressure valve position
116 LPV voltage signal
118 low pressure valve position
120 pressure curve
130 piston cycle curve
132 HPV voltage signal
134 high pressure valve position
136 LPV voltage signal
138 low pressure valve position
140 pressure curve

The invention claimed is:

1. A wind turbine generator or a tidal current generator comprising:
   a hub;
   a main shaft which is coupled to the hub;
   a generator for converting rotation energy transmitted from the main shaft to electric power;
   a hydraulic pump of variable displacement type configured to be driven by the main shaft;
   a hydraulic motor of variable displacement type which is connected to the generator;
   a high pressure oil line which is arranged between a discharge side of the hydraulic pump and an intake side of the hydraulic motor;
   a low pressure oil line which is arranged between an intake side of the hydraulic pump and a discharge side of the hydraulic motor;
   a pump controller for setting a target torque of the hydraulic pump and adjusting a displacement $D_p$ of the hydraulic pump based on the target torque and a pressure of operating oil in the high pressure oil line, and
   a motor controller for adjusting a displacement $D_m$ of the hydraulic motor based on a discharge amount $Q_p$ of the hydraulic pump obtained from the displacement $D_p$.

2. The wind turbine generator or the tidal current generator according to claim 1, further comprising:
   a rotation speed meter which measures a rotation speed of the main shaft,
   wherein the pump controller is configured to set the target torque at which a power coefficient becomes maximum in accordance with the rotation speed of the main shaft measured by the rotation speed meter.

3. The wind turbine generator or the tidal current generator according to claim 1, further comprising:
   an anemometer which measures a wind speed,
   wherein the pump controller is configured to obtain from the measured wind speed the target torque at which a power coefficient becomes maximum.

4. The wind turbine generator or the tidal current generator according to claim 1, wherein each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which is configured to open and close a communication path between each of the oil chambers and the high pressure oil line, and low pressure valves each of which is configured to open and close a communication path between each of the oil chambers and the low pressure oil line,
   wherein the pump controller is configured to control controls a ratio of disabled oil chambers to all of the oil chambers of the hydraulic pump so as to adjust the displacement $D_p$ of the hydraulic pump,
   wherein the pump controller is configured to control the disabled oil chambers of the hydraulic pump such that during a cycle of the piston of the hydraulic pump starting from a bottom dead center, reaching a top dead center and returning to the bottom dead center, the high pressure valve of the hydraulic pump is closed and the low pressure valve of the hydraulic pump remains open,
   wherein the motor controller is configured to control a ratio of disabled oil chambers to all of the oil chambers of the hydraulic motor so as to adjust the displacement $D_m$ of the hydraulic motor, and
   wherein the motor controller is configured to control the disabled oil chambers of the hydraulic motor such that during a cycle of the piston of the hydraulic motor starting from a bottom dead center, reaching a top dead center and returning to the bottom dead center, the high pressure valve of the hydraulic motor is closed and the low pressure valve of the hydraulic motor remains open.

5. The wind turbine generator or the tidal current generator according to claim 4, wherein the cam of the hydraulic pump is a ring cam which is disposed annularly on an outer circumference of the main shaft and has a cam profile defining a plurality of waves with a plurality of concave portions and convex portions that are alternately disposed around the main shaft, and
   wherein the cam of the hydraulic motor is an eccentric cam that is disposed eccentrically with respect to a shaft center of an output shaft of the hydraulic motor being coupled to the generator.

6. The wind turbine generator or the tidal current generator according to claim 4, wherein the high pressure valves of the hydraulic pump are check valves that allows only fluid flow from the oil chambers to the high pressure oil line, and the low pressure valves of the hydraulic pump are normally open solenoid-operated face-sealing valves,
   wherein, for the oil chambers of the hydraulic pump other than the disabled oil chambers, the pump controller is configured to close the low pressure valves when or after the pistons of the hydraulic pump reach the bottom dead center and keep the low pressure valves shut by a pressure difference between the oil chambers and the low pressure oil line so as to reduce the electric power required to hold closed the low pressure valves immediately after their closure by the pump controller.

7. The wind turbine generator or the tidal current generator according to claim 4, wherein the high pressure valves of the hydraulic motor are face-sealing solenoid valves and the low pressure valves of the hydraulic motor are face-sealing solenoid valves, and wherein, for the oil chambers of the hydraulic motor other than the disabled oil chambers, the motor controller is configured to close the low pressure valves immediately before the pistons of the hydraulic motor reach top dead centre and then open the high pressure valves in this order and then maintain the low pressure valves shut until immediately before the pistons of the hydraulic motor reach bottom dead centre, wherein the motor controller is configured to latch the high pressure valves in an open state until immediately before the re-opening of the low pressure valves.

8. The wind turbine generator or the tidal current generator according to claim 1, further comprising:

a pitch driving mechanism which adjusts a pitch angle of blades mounted on the hub, and a control unit for controlling the pitch driving mechanism so that the output of the wind turbine generator or the tidal current generator does not exceed the rated output.

9. The wind turbine generator or the tidal current generator according to claim 1, further comprising:

an exciter for adjusting power factor of power generated in a stator of the generator by changing a field current in a rotator of the generator, the generator being a synchronous generator.

10. The wind turbine generator or the tidal current generator according to claim 4, further comprising:

a bypass oil line which is arranged between the high pressure oil line and the low pressure oil line to bypass the hydraulic motor; and a relief valve which is arranged in the bypass oil line to maintain hydraulic pressure of the high pressure oil line not more than a set pressure, wherein the pump controller is configured to eliminate the disabled oil chambers to maximize the displacement $D_p$ of the hydraulic pump so as to raise the pressure in the high pressure oil line to a set pressure of the relief valve and reduce a rotation speed of the main shaft.

11. The wind turbine generator or the tidal current generator according to claim 1, wherein each of the hydraulic pump and the hydraulic motor includes a plurality of oil chambers each of which is surrounded by a cylinder and a piston moving slidingly in the cylinder, a cam having a cam profile which is in engagement with the piston, high pressure valves each of which is configured to open and close a communication path between each of the oil chambers and the high pressure oil line, and low pressure valves each of which is configured to open and close a communication path between each of the oil chambers and the low pressure oil line, wherein the pump controller is configured to adjust the displacement $D_p$ of the hydraulic pump by controlling a time period during which the low pressure valve of the hydraulic pump is kept closed while the piston of the hydraulic pump moves from a bottom dead center to a top dead center, and wherein the motor controller is configured to adjust the displacement $D_m$ of the hydraulic motor by controlling a time period during which the high pressure valve of the hydraulic motor is kept open while the piston of the hydraulic motor moves from a top dead center to a bottom dead center.

12. The wind turbine generator or the tidal current generator according to claim 11, further comprising:

a grid state determination unit for determining a state of a grid which is synchronized with the generator, wherein, when the grid state determination unit determines that a voltage of the grid has decreased, the motor controller is configured to ramp down the displacement $D_m$ of the hydraulic motor to an amount required for keeping the generator synchronized with the grid in a few milliseconds.

13. The wind turbine generator or the tidal current generator according to claim 1, wherein the motor controller is configured to set the displacement $D_m$ of the hydraulic motor based on a measurement of the hydraulic pressure in the high pressure oil line, and adjust the displacement $D_m$ of the hydraulic motor to maintain the hydraulic pressure in the high pressure oil line within an acceptable pressure range.

14. An operation method of a wind turbine generator or a tidal current generator which comprises a hub, a main shaft connected to the hub, a generator for converting a rotation energy transmitted from the main shaft to electric power, a hydraulic pump rotated by the main shaft, a hydraulic motor of variable displacement type connected to the generator, a high pressure oil line arranged between a discharge side of the hydraulic pump and an intake side of the hydraulic motor and a low pressure oil line arranged between an intake side of the hydraulic pump and a discharge side of the hydraulic motor, the method comprising:

a target torque calculation step of calculating a target torque of the hydraulic pump at which a power coefficient becomes maximum;

a pump displacement determination step of determining a setting value of a displacement $D_p$ of the hydraulic pump based on the target torque calculated in the target torque calculation step and a hydraulic pressure in the high pressure oil line;

a motor displacement determination step of determining a setting vale of a displacement $D_m$ of the hydraulic motor based on a discharge amount $Q_p$ of the hydraulic pump that is obtained from the displacement $D_p$ set in the pump displacement setting step; and a controlling step of controlling the hydraulic pump and the hydraulic motor based on the setting values of the displacements $D_p$ and $D_m$.

15. The wind turbine generator or the tidal current generator according to claim 1, wherein the pump controller is configured to adjust the displacement $D_p$ to a setting value obtained from the target torque and a measured value of the pressure in the high pressure oil line, and wherein the motor controller is configured to adjust the displacement $D_m$ to a setting value obtained based on the discharge amount $Q_p$ and a deviation of the measured value from a target value of the pressure in the high pressure oil line.

16. The wind turbine generator or the tidal current generator according to claim 15, wherein the target value of the pressure monotonically increases with an increase of a rotational speed of the main shaft.

17. The operation method of a wind turbine generator or a tidal current generator according to claim 14, wherein, in the pump displacement determination step, the setting value of the displacement $D_p$ is determined from the target torque and a measured value of the pressure in the high pressure oil line, and wherein, in the motor displacement determination step, the setting value of the displacement $D_m$ is determined based on the discharge amount $Q_p$ and a deviation of the measured value from a target value of the pressure in the high pressure oil line.

18. The operation method of a wind turbine generator or a tidal current generator according to claim 17, wherein the target value of the pressure monotonically increases with an increase of a rotational speed of the main shaft.

19. The operation method of a wind turbine generator or a tidal current generator according to claim 14, wherein the wind turbine generator or the tidal current generator further comprises:

a bypass oil line which is arranged between the high pressure oil line and the low pressure oil line to bypass the hydraulic motor; and a relief valve which is arranged in the bypass oil line to maintain hydraulic pressure of the high pressure oil line not more than a set pressure, and wherein, in the pump displacement determination step, the setting value of the displacement $D_p$ is maximized so as to raise the pressure in the high pressure oil line to the set pressure of the relief valve and reduce a rotation speed of the main shaft.

* * * * *